(12) United States Patent
Balakrishnan et al.

(10) Patent No.: US 8,082,227 B2
(45) Date of Patent: Dec. 20, 2011

(54) SESSION SENSITIVE DATA BACKUPS AND RESTORES

(75) Inventors: Kalidas Balakrishnan, TamilNadu (IN); Shyamsundar Ranganathan, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 567 days.

(21) Appl. No.: 11/821,841

(22) Filed: Jun. 26, 2007

(65) Prior Publication Data

US 2008/0086518 A1   Apr. 10, 2008
US 2011/0191291 A2   Aug. 4, 2011

(30) Foreign Application Priority Data

Oct. 10, 2006   (IN) .......................... 2230/DEL/2006

(51) Int. Cl.
*G06F 7/00* (2006.01)
*G06F 17/00* (2006.01)

(52) U.S. Cl. ...................................... 707/640
(58) Field of Classification Search .................. 707/640, 707/999.204
See application file for complete search history.

(56) References Cited

U.S. PATENT DOCUMENTS

| 6,446,085 B1 * | 9/2002 | Gusler et al. ................. 707/200 |
| 6,453,325 B1 | 9/2002 | Cabrera et al. |
| 6,484,186 B1 | 11/2002 | Rungta |
| 6,560,615 B1 * | 5/2003 | Zayas et al. .................. 707/202 |
| 6,594,228 B1 | 7/2003 | Naidoo et al. |
| 6,611,850 B1 | 8/2003 | Shen |
| 6,910,112 B2 | 6/2005 | Berkowitz et al. |
| 6,948,038 B2 | 9/2005 | Berkowitz et al. |
| 2002/0101791 A1 | 8/2002 | Ito |
| 2006/0075294 A1 * | 4/2006 | Ma et al. ......................... 714/13 |
| 2008/0059541 A1 * | 3/2008 | Fachan et al. ................. 707/204 |

OTHER PUBLICATIONS

"Tivoli Storage Manager for UNIX Using the Backup-Archive Clients", http://publib.boulder.ibm.com/tividd/td/TSMC/SH26-4122-01/en_US/, Downloaded Sep. 19, 2006,6 pages (No date listed).
"Tivoli Storage Manager, Version 5.3.2", http://publib.boulder.ibm.com/infocenter/tivihelp/v1r1/topic/com.ibm.its, Downloaded Sep. 19, 2006,4 pages,(No date listed).

* cited by examiner

*Primary Examiner* — John E Breene
*Assistant Examiner* — Aleksandr Kerzhner
(74) *Attorney, Agent, or Firm* — Barry N. Young

(57) ABSTRACT

Techniques for the session sensitive data backups and restores are presented. Data having a plurality of hard linked file references are backed up and restored once during a backup operation. Any modifications to the backed up data are noted as session-specific versions and also backed up once. The hard linked file references are maintained in a data structure and managed during backups to define associations to the backed up data and to the session-specific versions of the data. The data structure is also used during restores to re-establish desired hard linked file reference associations to either the backed up data or to a particular session-specific versions of the data.

22 Claims, 3 Drawing Sheets

SESSION SENSITIVE DATA BACKUPS AND RESTORES

RELATED APPLICATIONS

The present application claims priority to India Patent Application No. 2230/DEL/2006 filed in the India Patent Office on Oct. 10, 2006 and entitled "Session Sensitive Data Backups and Restores;" the disclosure of which is incorporated by reference herein.

FIELD

The invention relates generally to data processing and more particularly to data backups and restores.

BACKGROUND

Data has become an extremely important asset of enterprises. Consequently, an enterprise's data is regularly backed up or check pointed to ensure that it can be recovered back to some manageable point in time in the event of an unexpected failure.

Typically, during a backup operation the data associated with every file is backed up regardless of the type of file encountered during the backup operation. A hard linked file is data organized such that several file references each point to the same physical file data. Consequently, during a backup operation each time a hard linked file reference is encountered the link information is maintained and the physical data that the file reference points to is backed up. It is apparent that this is inefficient in terms of space and processing, since the identical physical data is being backed up multiple times during a single backup operation. Furthermore, this duplication of data can consume considerable amount of archive space and is not needed during data restore.

It may also be the case that during a backup operation the physical data associated with a hard linked file reference is modified by a newly created file reference, which occurs after the backup operation commences, but before the backup operation concludes. In such a situation, the conventional approach is to retain each file reference and each copy of the data; and during a restore each copy keeps writing over itself until the final restore reflects a most recent version of the physical data. However, this may not adequately reflect what user's desire. In other words, the change to the physical data by the subsequently added file reference may not be what is desired. Present techniques do not permit a user or administrator to decide what version of the physical data to restore for hard linked file references; rather during a restore operation the user or administrator gets the last backed up version of that data.

Thus, it is advantageous to provide improved techniques for data backups and restores.

SUMMARY

In various embodiments, techniques for session-sensitive data backups and restores are provided. More specifically, and in an embodiment, a method for performing a session-sensitive data backup operation is presented. A backup operation is initiated. Furthermore, a first hard link for primary data is detected and a second hard link for the primary data is detected. The first and second hard links are backed up within a link data structure that is associated with the backup operation and the primary data is backed up just once. Next, a third hard link for a modified version of the primary data is encountered during the backup operation. The third hard link is backed up within the data structure and the modified version of the primary data is backed up as a session-specific version of the primary data.

DETAILED DESCRIPTION

As used herein "hard linked" or "hard link" refers to a characteristic of data where multiple references or pointers within a same storage environment or volume refer to the same physical file or data. So, as an example consider file references A and B and physical data referenced in directory D as physical file data X on volume V (full path to X on V appears as "D/X"). X is hard linked file data where A and B are hard linked file references to X. In other words, A and B both point to "D/X." In UNIX and LINUX an iNode data structure is often used on physical file data (such as X) as a metadata structure that describes the unique identity for the physical file data X and that includes a counter indicating how many hard linked file references point to X. In the present example, the iNode count is 2 because A and B point to X.

Also, as used herein "reference," "pointer," and "link" are terms that may be used interchangeably. These are data structures that identify a file path to physical data on a particular storage device or particular directory location. In other words, a file reference when activated from one directory traverses a path to another new location to access data that the file reference is associated with. In some cases, the pointer may point to a different directory from the directory in which it is located and in other cases the pointer may point to the same directory but a different location within that same directory.

Various embodiments of this invention can be implemented in existing network architectures, directory services, security systems, and/or communication devices. For example, in some embodiments, the techniques presented herein are implemented in whole or in part in the Novell® network, proxy server products, email products, operating system products, and/or directory services products distributed by Novell®, Inc., of Provo, Utah.

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

Figure 1:
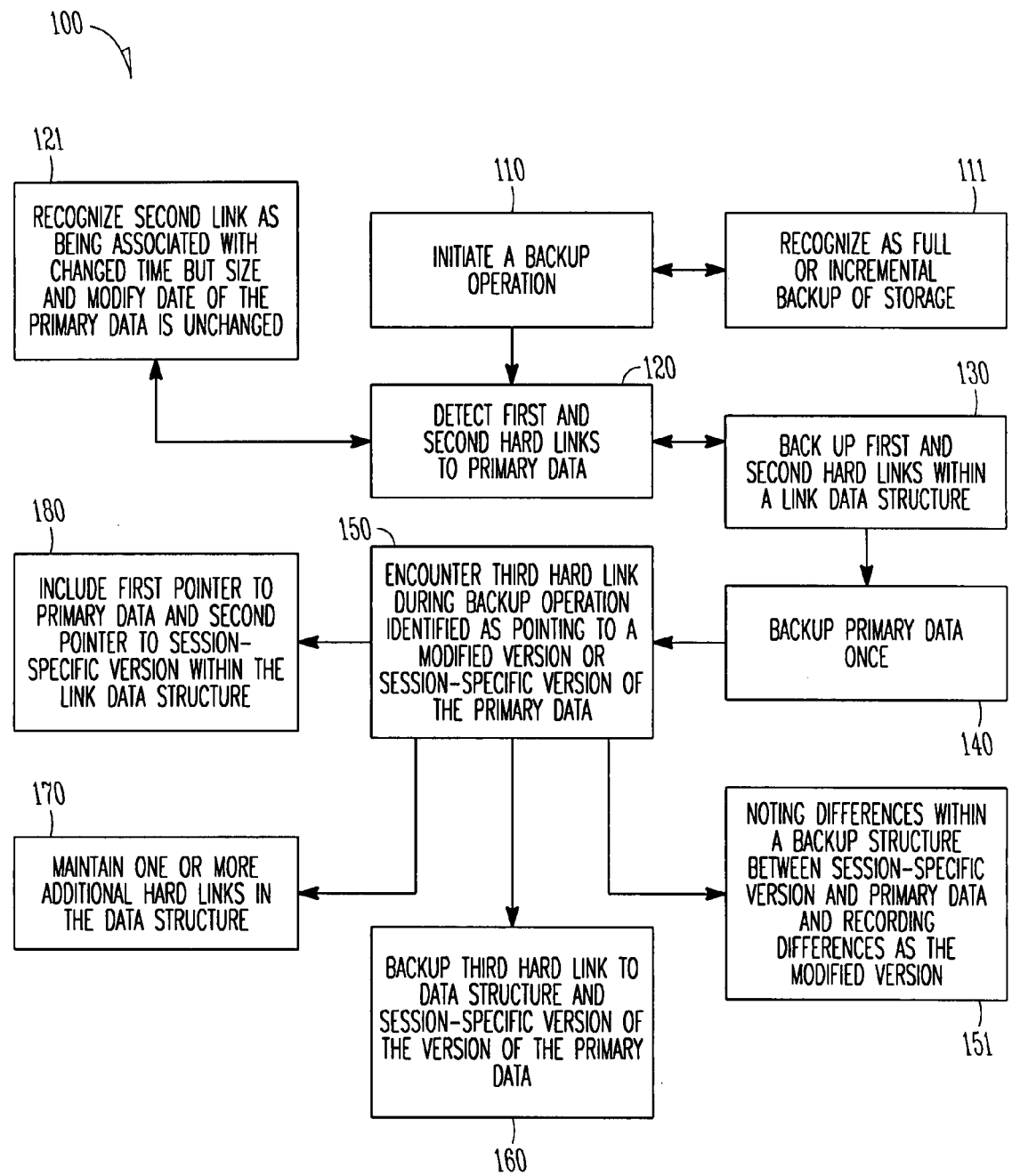
FIG. 1 is a diagram of a method for performing a session-sensitive data backup operation, according to an example embodiment.

FIG. 1 is a diagram of a method 100 for performing a session-sensitive data backup operation, according to an example embodiment. The method 100 (hereinafter "backup service") is implemented in a machine-accessible and readable medium. The backup service is operational over and processes within a network. The network may be wired, wireless, or a combination of wired and wireless. The service may be implemented as instructions that when accessed by a machine performs the processing depicted in FIG. 1.

In conventional backup services, when a file reference is encountered and it points to physical data that was already backed up, the physical data is backed up a second time. This is not the case with the backup service represented by the processing depicted in the FIG. 1. The physical data, if unchanged, is backed up once regardless of the number of file references detected and backed up that point to the same physical file data. Other features and structures are produced as well that are beneficial to produce a session-sensitive backup. These will be discussed herein and below.

It is also initially noted that the backup service may operate in two modes, a full backup mode or an incremental backup mode. During a full backup mode an entire storage, network, directory, file system, environment, volume, and/or device that is the target of a backup operation is copied along with beneficial metadata for subsequent restore, if desired. During an incremental backup mode, only changes for a target storage, file system, network, directory, environment, volume, and/or device that are noted from a previous backup operation are copied along with the necessary metadata for subsequent restore.

With this context the processing of the backup service is now discussed with reference to the FIG. 1. At 110, a backup operation is initiated. The backup service may, at 111, recognize the backup operation as either a full backup operation or an incremental backup operation. The backup operation may be directed to a target storage, file system, memory, network, directory, environment, volume, and/or device. According to an embodiment, the backup operation is associated with the LINUX or UNIX operation system; although it is noted any operation system may be used.

At 120 and during the backup operation, the backup service detects a first hard link for primary data and second hard link for the same primary data. The first time the first hard link that references the primary data is encountered the backup service backs up or copies the primary data into backup data structures. The first hard link is also noted in a link data structure. When the second hard link is encountered, the primary data to which it points to is already backed up, so the backup service just backs up the second hard link in the link data structure. In this manner, the primary data is backed up once for two different hard link references (first and second hard links).

According to an embodiment, at 121, it may be that the second hard link is recognized as having been modified, but the modification is with respect to the metadata associated with the second hard link and not the primary data. In other words, the name may have changed for the second hard link or an access time may have changed after the backup operation was started. Yet, the modify date and time associated with the primary data and the size of the primary data are unchanged when the backup service encounters the second hard link. This informs the backup service that the primary data is unchanged from when it was backed up with the first hard link and informs the backup service that there is no need to backup the primary data a second time when the second hard link is encountered.

At 130, the backup service backs up the first and second hard links within the link data structure when they are each encountered. The link data structure includes link information for each hard link encountered during the backup operation. Each primary file data is associated with a unique identifier, such as an iNode in the LINUX or UNIX operation system (OS) environment. The unique identifier may be used to index into the data structure and identify other information associated with the hard links (first and second hard links) that reference the primary file data.

According to an embodiment, the link data structure is a chain, hash, or linked list of other data structures. Each data structure in a hash entry represents an instance of primary file data and each of its hard links encountered (such as first hard link and second hard link) during the backup operation. Each hash entry for a particular primary data includes a chain of data structures representing each hard link reference encountered for a particular instance of the primary file data and each hard link data structure in the chain includes, by way of example only, an iNode identifier to identify the primary file data, a file system identifier to identify the file system to which the primary data belongs, a link count that identifies the total number of links that point to this hard link reference (incremented each time a new link is encountered that points to this hard link reference), a link name that identifies the source name of the primary file data to which the hard link reference is associated and a next pointer for chaining a next hard link data structure having the same primary file data identifier (e.g., iNode). It is to be understood that other information may be included and that the link data structure may be configured in a variety of different manners. The point is that the link data structure permits session-specific primary data to be associated with the hard links during the backup operation, as will be more completely described herein and below.

As was mentioned above and again at 140, the backup service may use the link data structure that it is creating and managing (in the case of an incremental data backup operation) to identify the primary data that has already been backed up. Thus, the primary data is backed up once when it is unchanged but can still be encountered more than once during the backup operation, such as when the second hard link is detected, which references the primary data a second time.

At 150, the backup service encounters a third hard link during the backup operation. At this point the backup service detects that the primary data to which the third hard link points is the same primary data already backed up but it appears to the backup service that the primary data has changed. In other words, a user or automated service altered or modified the primary data after the backup operation was started and before the backup operation is able to conclude. This represents a new session or a session-specific version of the primary data. The backup service may detect that the modification occurred by detecting a new modified date and time in the metadata associated with the primary data or by detecting that the size of the primary data has changed.

It is noted, that in some cases the backup service may not have to copy all of the modified version of the primary data when it backs the session-specific version of the primary data up after encountering the third hard link. That is, the backup service may use metadata that describes differences that can be applied by a restore service against the primary data (already backed up) to construct or derive the session-specific version of the primary data.

In response to the changed primary data (session-specific version of the primary data), at 160, the backup service backs up the third hard link to the link data structure and backs up the session-specific version of the primary data. In the example data structure presented above for the link data structure this may entail including a new source name for the link name to identify the session-specific version of the primary data. So, the link data structure includes the same identifier for the primary data and includes a chain, hash, or linked list of structures for that primary data identifier, where each entry in the list represents a particular hard link reference (first, second, and third hard links) and each entry includes a link name that identifies the source data (primary data or session-specific version of the primary data).

In this manner, the link data structure facilitates communicating session-sensitive backups for primary data having the same identifier (e.g., iNode) for the entire hard link network associated with the primary data. Some hard links may have initially referred to the primary data, such as the first and second hard links, while other hard lines refer to the session-specific version of the primary data, such as the third hard link.

At 170, the backup service may manage the link data structure for a variety of other hard links associated with the primary data, the session-specific version of the primary data, other session-specific versions of the primary data encountered during the backup operation, and other primary data entirely.

At 180 and as was mentioned above, the backup service may use a first pointer or name to reference the primary data within the link data structure and a second pointer or name to reference the session-specific version of the primary data for a same primary data identifier (e.g., iNode). In this manner, the same identifier for physical data is referenced two or more times to reflect session-specific versions. A session-specific version represents a version of the primary data that is altered during the backup operation by users or other automated services before the backup operation has a chance to conclude.

The link data structure, which is created and managed by the backup service during a backup operation or job, is subsequently consumed by a session-sensitive restore service, such as the one discussed below with reference to the method 200 of the FIG. 2.

Figure 2:
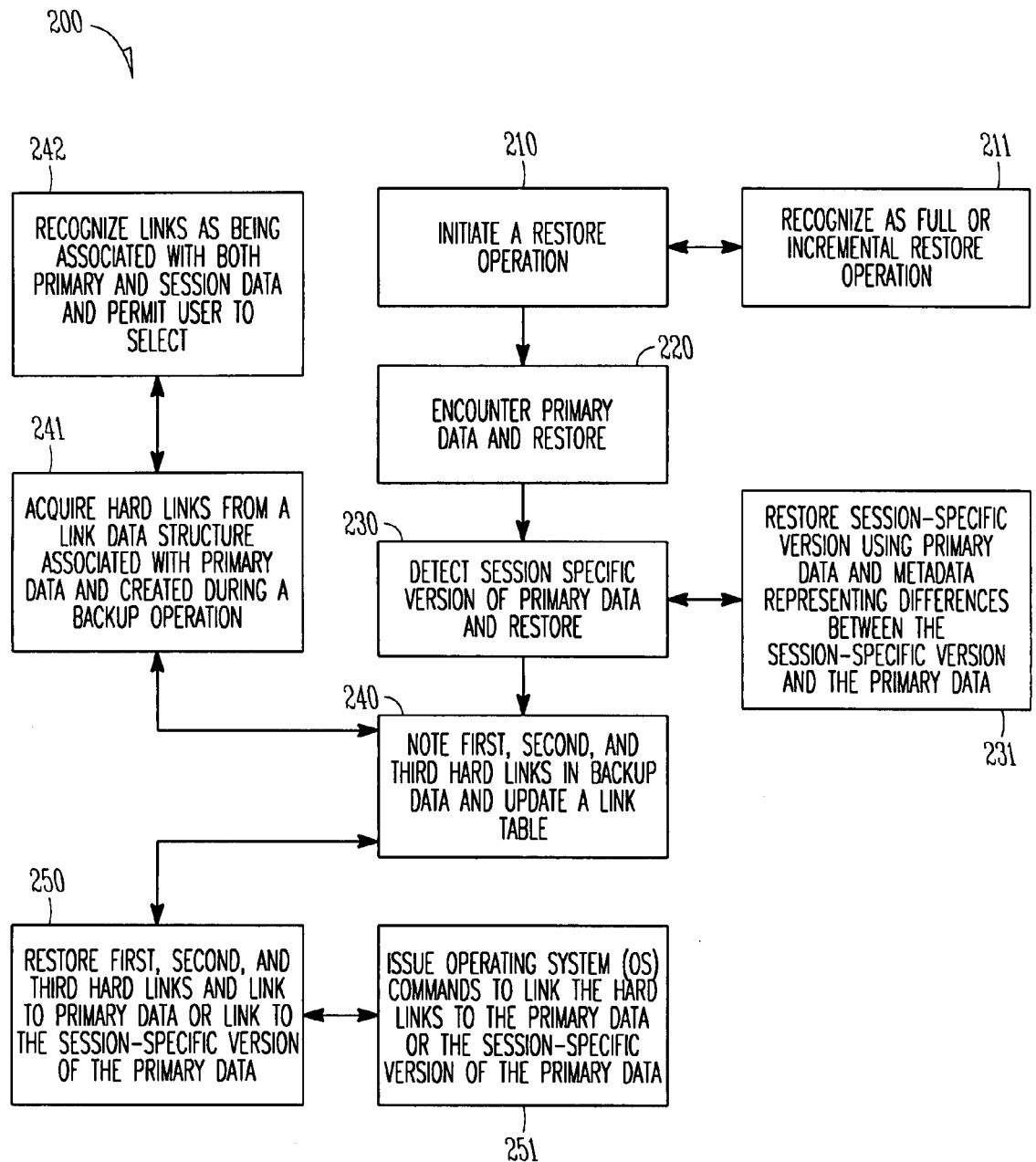
FIG. 2 is a diagram of a method for performing a session-sensitive data restore operation, according to an example embodiment.

FIG. 2 is a diagram of a method for performing a session-sensitive data restore operation, according to an example embodiment. The method 200 (hereinafter "restore service") is implemented in a machine-accessible and readable medium and is operational over a network. The network may be wired, wireless, or a combination of wired and wireless. The restore service is implemented as instructions that when executed by a machine perform the processing depicted in the FIG. 2. The restore service cooperates with output and data structures produced by the backup service represented by the method 100 and depicted in the FIG. 1 above.

At 210, the restore service initiates a restore operation against a target backup data structure. The target backup data structure was previously created by a backup service in the manner described above with reference to the method 100 of the FIG. 1.

Similar to the backup service of the FIG. 1, the restore service may recognize, at 211, the restore operation as being a full restore or an incremental restore.

At 220, the restore service encounters primary data from the backup data and restores it. At 230, the restore service also detects a session-specific version of the primary data and restores it. In some cases, at 231, this may be done by the restore service using metadata reflecting difference to apply to the primary data in order to recreate or derive the session-specific version of the primary data. So, the entire session-specific version of the primary data does not have to be present in the backup data or data structures; although it can be.

At 240, the restore service notes first, second, and third hard links in the backed up data and updates a link table with the hard link information. At 241, the link information and the hard links are acquired from a link data structure, such as the link data structure produced by the backup service represented by the method 100 of the FIG. 1. The link data structure was created during a full or incremental backup operation performed by the backup service.

At 242, the restore service may recognize the links within the link data structure as being associated with both the primary data and with the session specific version of the primary data.

The restore service may then make a decision as to whether the first, second, and third hard links are to be associated with the primary data or with the session-specific version of the primary data. This can be done by profile settings, configuration settings, processing parameter settings, or by manual selections supplied by a user or an automated service. So, in some cases by default the restore service may remove the primary data (overwrite it) with the session-specific version of the primary data, or it may by default remove the session-specific version and maintain the primary data. Alternatively, the choice as to which data to keep in the restore for each of the hard links is given to the user or can be dynamically communicated by a service requesting the restore operation of the restore service.

Thus, at 250, and once a decision is made as to whether to keep the primary data or the session-specific version of the primary data, the restore service, at 250, restores the first, second, and third hard links and associates the hard links to the primary data or to the session-specific version of the primary data, depending upon the decision made.

In some embodiments, at 251, the restore service may use OS commands to re-establish the linkages or associations between the hard links and either the primary data or the session-specific version of the primary data. That is, the OS's API may be used to facilitate the restore operation from the link table.

The restore service uses the link data structure and the backed up data produced from the backup service to present options on restore. The options permit hard links to be restored for primary data as it existed initially at the start of a backup operation or as it subsequently existed while the backup operation continued. It is noted, that more than one session-specific version of the primary data may exist in the backup data and thus more than one choice may be presented and made with respect to which version the hard links will be restored with. It may also be the case that a user or administrator can identify a particular time period for which a session-specific version of the primary data is to be restored. So, an administrator may state that a restore is to occur for a given volume or system associated with a prior backup operation for an administrator-defined time period. A selection can then be made to pick the proper session-specific version of the primary data that comports with the administrator-selected time period.

It is also noted that FIG. 2 is presented for purposes of illustration only and that the processing blocks may occur in a different order. For example, the restore service may serially traverse the backup data and note file references, each file reference may be classified as primary data or as a link and if classified as a link it is updated to the link table and if classified as primary data it is initially restored. The link data structure is then used to properly identify the correct version of the primary data to maintain and an OS's API used to establish the hard link network for the version of primary data being restored.

Figure 3:
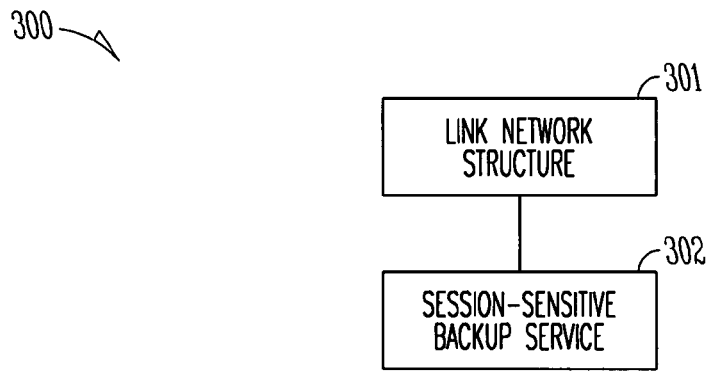
FIG. 3 is a diagram of session-sensitive data backup system, according to an example embodiment.

FIG. 3 is a diagram of session-sensitive data backup system 300, according to an example embodiment. The session-sensitive data backup system 300 is implemented in a machine-accessible and readable medium and is operational over a network. The network may be wired, wireless, or a combination of wired and wireless. The session-sensitive data backup system 300 implements, among other things, the processing associated with the backup service represented by the method 100 of the FIG. 1.

The session-sensitive data backup system 300 includes a link network structure 301 and a session-sensitive backup service 302. Each of these will now be discussed in turn.

The link network structure 301 is created and managed by the session sensitive backup service 302. The link data structure 301 includes a network of hard links associated with data being backed up during a backup operation. A network for each primary data identifier includes first hard links directed to being associated with that identifier. The network also includes at least one second hard link directed to the same identifier but associated with a modified or session-specific version of the primary data. An example, link network structure 301 was presented above with reference to the backup service represented by the method 100 of the FIG. 1 and was referred to as the link data structure. The link network structure 301 may include a series of sub structures or lists, such that each list is associated with given identifier (e.g., iNode) for particular primary data.

In an embodiment, the link network structure 301 is indexed by a same iNode number for primary data and for any session-specific versions of that same primary data.

The session-specific backup service 302 performs session-sensitive backup operations on storage. The backup operations may be full backups or incremental backups. Example processing associated with the session-specific backup service 302 was discussed in detail above with reference to the backup service represented by the method 100 of the FIG. 1.

The session-specific backup service 302 creates and manages the link network structure 301. First and second links detected for the same primary data are represented in the link network structure 301 and associated with primary data that is backup in the backup data just once. Third links detected, which are associated with session-specific versions of the same primary data, are also represented in the link network structure 301 for the same primary data identifier but point within the link network structure 301 to their session-specific versions of the primary data.

The session-specific backup service 302 backs up the primary data independent of a total number of hard links that reference the primary data and the session-specific backup service 302 backs up each session-specific version of the primary data independent of a total number of hard links that reference any particular session-specific version.

The session-specific versions are detected as occurring after the commencement of a backup operation being processed by the backup service but before the backup service concludes or completes the backup operation. The link network structure 301 produced and managed by the session-specific backup service 302 is subsequently consumed by a session-sensitive restore service to provide choices as to which version of the primary data to restore with the hard links associated with the link network structure 301. Example processing of such a session-sensitive restore service was presented above with reference to the method 200 of the FIG. 2.

Figure 4:
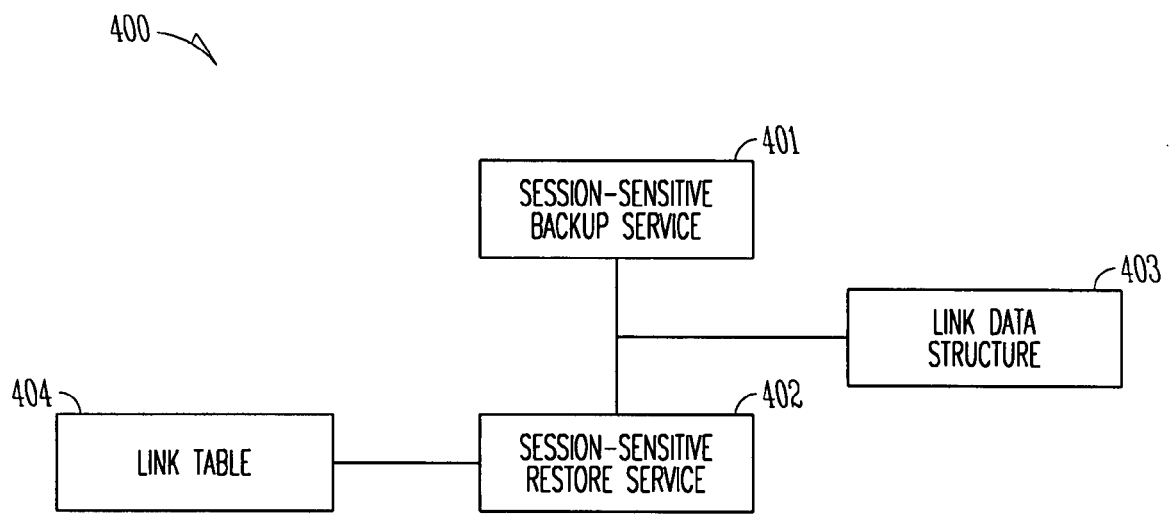
FIG. 4 is a diagram of session-sensitive data backup and restore system, according to an example embodiment.

FIG. 4 is a diagram of session-sensitive data backup and restore system 400, according to an example embodiment. The session-sensitive data backup and restore system 400 is implemented in a machine-accessible and readable medium and is accessed and processed over a network. The network may be wired, wireless, or a combination of wired and wireless. The session-sensitive data backup and restore system 400 implements, among other things, the backup service represented by the method 100 of the FIG. 1; the restore service represented by the method 200 of the FIG. 2; and the session-sensitive data backup system 300 described with reference to the FIG. 3.

The session-sensitive data backup and restore system 400 includes a session-sensitive backup service 401 and a session-sensitive restore service 402. The session-sensitive data backup and restore system 400 may also include a link data structure 403 and/or a link table 404. Each of these and their interactions with one another will now be discussed in turn.

The session-sensitive backup service 401 performs incremental or full backup operations or jobs on target storage, memory, devices, directories, file systems, environments, etc. During the backup jobs the session-specific backup service 401 maintains associations between hard links and different versions of primary data that present themselves during the course of executing the backup jobs. In other words, the primary data associated with the hard links is modified after the jobs start but before the jobs complete or conclude. Example processing associated with the session-specific backup service 400 was presented above with reference to the FIGS. 1 and 3.

More specifically, the session-specific backup service 400 maintains first hard links to primary data and second hard links to a session-specific version of the primary data during a backup operation. The primary data is backed up once regardless of the number of first hard links encountered. Similarly, the session-specific version of the primary data is backed up once regardless of the number of second hard links encountered.

According to an embodiment, the session-specific backup service 400 produces and manages a link data structure 403. Examples of the link data structure 403 were presented above with respect to the FIGS. 1 and 3. The backup data and structures produced by the session-specific backup service 400 is consumed by the session-sensitive restore service 402.

The session-sensitive restore service 402 is either preconfigured or presents selectable options to restore the first and second hard links for the primary data or for a desired session-specific version of the primary data. Mechanisms to achieve this were discussed above with reference to the FIG. 2.

In some cases, the session-sensitive restore service 402 writes hard links as encountered to a link table 404 using link information included in the link data structure 403. Once a decision is made was to whether to restore the primary data or a session-specific version of the primary data, the session-sensitive restore service 402 may use the link table 404 to interact with commands or an API of an OS and establish the link network or environment between the first and second hard links and the target version of the primary data.

It is noted that the teachings presented herein and above may be implemented in any OS architecture or environment; assuming the notion of a hard link file is supported in that OS. Accordingly, in some embodiments, the teachings may be deployed in a LINUX or UNIX OS where a hard linked file is supported and available.

It is now understood how backups and restores may process more space and processor efficiently and how backups and restores may be session-sensitive.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   initiating a backup operation;
   detecting a first hard link for primary data and a second hard link for the primary data and backing up the first and second hard links within a link data structure associated with the backup operation and backing up the primary data once; and
   encountering a third hard link for a modified version of the primary data during the backup operation and backing up the third hard link within the data structure and backing up the modified version of the primary data as a session-specific version of the primary data by describing changes of the modified version in metadata and using the metadata as the session-specific version of the primary data, the metadata represents the primary data that is altered via the changes during the backup operation and before the backup operation has a chance to conclude, the link data structure includes a same identifier for the primary data and the modified version of the primary data, the same identifier stored in an single entry within the linked data structure and the entry includes a list of additional information including the first hard link, the second hard link, and the third hard link, the third hard link including a pointer to the metadata, the linked data structure includes hashed entries, each hashed entry representing particular primary data as a chain of additional data structures, and each additional data structure having: a particular identifier for the particular primary data, a particular file system identifier for a file system of the particular primary data, a link count that identifies a total number of links that point to a particular hard link for the hashed entry, and a next pointer for a next additional data structure in the chain for the hashed entry.

2. The method of claim 1 further comprising, maintaining one or more additional hard links within the link data structure for the primary data, for the session-specific version, for other session-specific versions of the primary data, and for other primary data.

3. The method of claim 2 further comprising, including a first pointer in the link data structure that references the primary data and including a second pointer in the link data structure that references the modified version of the primary data.

4. The method of claim 1, wherein detecting further includes recognizing that the second hard link has a changed time but that a size and a modify date and time for the primary data are unchanged from that which is associated with the first hard link.

5. The method of claim 1, wherein encountering further includes noting differences, within a backup structure during the backup operation, for the modified version in relation to differences with the primary data and recording the differences as the modified version within the backup structure.

6. The method of claim 1, wherein initiating further includes recognizing the backup operation as a full backup of storage or as an incremental backup of storage.

7. A method, comprising:
   initiating a restore operation;
   encountering primary data in backup data and restoring the primary data;
   detecting a session-specific version of the primary data in the backup data and restoring the session-specific version, the session-specific version of the primary data representing an altered version of the primary data that occurred during a backup operation and before the backup operation had a chance to conclude, the session-specific version represented as changes to the primary data defined in metadata that can be applied to the primary data to arrive at the session specific version; and
   noting first, second, and third hard links in the backup data and updating a link table, wherein the first, second, third hard links reference the primary data and the session-specific version of the primary data as one entry in the link table using a same identifier for the primary data and the session-specific data, the one entry includes a list having the first hard link, the second hard link, and the third hard link, and the third hard link having a pointer to the metadata, the linked table includes hashed entries, each hashed entry representing particular primary data as a chain of additional data structures, and each additional data structure having: a particular identifier for the particular primary data, a particular file system identifier for a file system of the particular primary data, a link count that identifies a total number of links that point to a particular hard link for the hashed entry, and a next pointer for a next additional data structure in the chain for the hashed entry.

8. The method of claim 7 further comprising:
   restoring the first, second, and third hard links from the link table; and
   linking the first, second, and third hard links to the primary data or to the session-specific version of the primary data.

9. The method of claim 8, wherein restoring further includes issuing one or more operating system commands to link the first, second, and third hard links to the primary data or to the session-specific version of the primary data.

10. The method of claim 7, wherein initiating the restore operation further includes recognizing the restore operation as a full restore operation or an incremental restore operation.

11. The method of claim 7, wherein noting further includes acquiring the first, second, and third hard links from a link data structure associated with the primary data within the backup data and created during the backup operation.

12. The method of claim 11 further comprising:
   recognizing from the link data structure that the first, second, and third hard links are associated with both the primary data and the session-specific version of the primary data; and
   permitting a user to select between linking the first, second, and third hard links to the primary data or linking the first, second, and third hard links to the session-specific version of the primary data for restoration during the restore operation.

13. A system, comprising:
   a link network structure; and
   a session-sensitive backup service, the session-sensitive backup service is to build the link network structure by representing first hard links directed to primary data detected in storage during a backup operation and by representing at least one second hard link directed to a session-specific version of the primary data, the session-specific version represented as metadata defining changes that when applied to the primary data provides the session-specific version, and the session-sensitive backup service is to backup the primary data once and independent of a total number of first hard links and is to backup the session-specific version of the primary data, via the metadata, and independent of a total number of second hard links, the session-specific version representing the primary data altered during the backup operation and before the backup operation concludes and defined by the metadata, the link data structure include a single identifier and entry for the primary data and the session-specific version of the primary data, the entry including a list having the first hard links and the second hard links and the second hard links including pointers to the metadata, the linked data structure includes hashed entries, each hashed entry representing particular primary data as a chain of additional data structures, and each additional data structure having: a particular identifier for the particular primary data, a particular file system identifier for a file system of the particular primary data, a link count that identifies a total number of links that point to a particular hard link for the hashed entry, and a next pointer for a next additional data structure in the chain for the hashed entry.

14. The system of claim 13, wherein the session-sensitive backup service is to index the link network structure by a same iNode number associated with both the primary data and the session-specific version of the primary data.

15. The system of claim 13, wherein the session-sensitive backup service detects the session-specific version and the second hard link as being generated within storage after the backup operation commences but before it concludes.

16. The system of claim 13, wherein the session-sensitive backup service adds third hard links within the link network structure, wherein the third hard links are associated with other primary data detected during the backup operation.

17. A system, comprising:
a session-sensitive backup service; and
a session-sensitive restore service, the session-sensitive backup service maintains first hard links to primary data and second hard links to a session-specific version of the primary data during a backup operation and backs up the primary data and the session-specific version of the primary data just once during the backup operation, the session-specific version represented as metadata defining changes that when applied to the primary data provides the session-specific version, and the session-sensitive restore service restores the primary data or of the session-specific version of the primary data during a restore operation, by applying the changes defined in the metadata to the primary data, and the session-sensitive restore service enables the first and second hard links to be associated with the primary data or enables the first and second hard links to be associated with the session-specific version of the primary data, the session-specific version represents the primary data altered during the backup operation and before the backup operation concludes, the session-sensitive backup service creates a backup data structure where the primary data and the session-specific version are identified via a same identifier and within a single entry in the data backup structure, the single entry including a list for the first hard links and the second hard links and the second hard links including pointers to the metadata, and the session-sensitive restore service uses the backup data structure during the restore operation, the data backup structure includes hashed entries, each hashed entry representing particular primary data as a chain of additional data structures, and each additional data structure having: a particular identifier for the particular primary data, a particular file system identifier for a file system of the particular primary data, a link count that identifies a total number of links that point to a particular hard link for the hashed entry, and a next pointer for a next additional data structure in the chain for the hashed entry.

18. The system of claim 17 further comprising, a link data structure, wherein the link data structure is generated and managed by the session-sensitive backup service to house the first hard links and the second hard links and their associations with the primary data and the session-specific version of the primary data.

19. The system of claim 18, wherein the session-sensitive restore service uses the link data structure during the restore operation to identify the first hard links and the second hard links and their associations to the primary data and the session-specific versions of the primary data.

20. The system of claim 17 further comprising, a link table, wherein the session-sensitive restore service notes the associations between the first, second, and third hard links to the primary data and the session-specific version of the primary data, and wherein the session-sensitive restore service uses the link table to request an operating system to establish the associations to either the primary data or the session-specific version of the primary data to complete the restore operation.

21. The system of claim 17, wherein the backup operation can be a full backup operation or an incremental backup operation.

22. The system of claim 17, wherein the restore operation can be a full restore operation or an incremental restore operation.

* * * * *